: 3,020,213
FRACTIONATION CONTROL SYSTEM
Dale E. Lupfer, Bartlesville, Okla., assignor to Phillips Petroleum Company, a corporation of Delaware
Filed Nov. 16, 1959, Ser. No. 853,340
9 Claims. (Cl. 202—160)

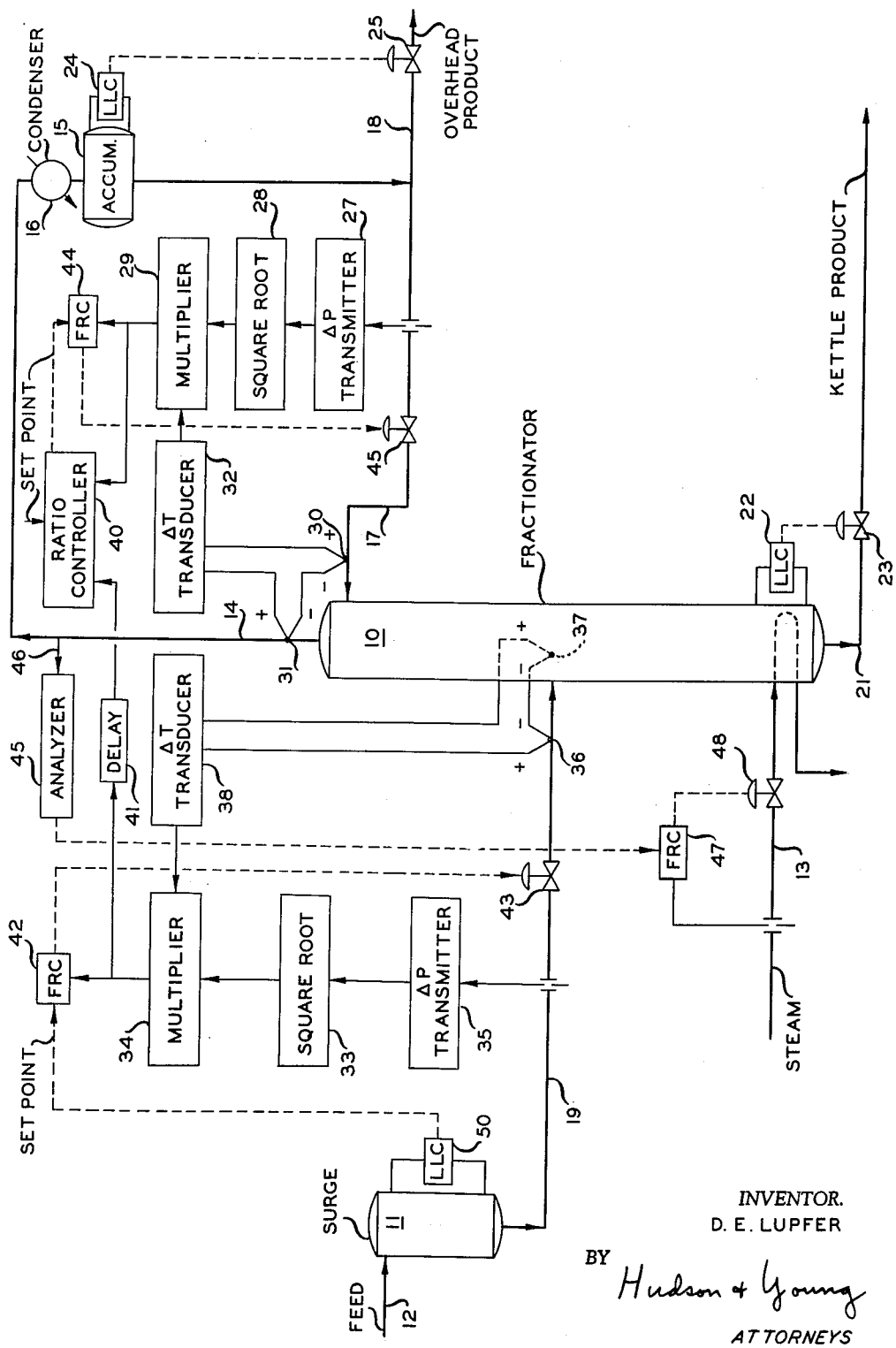

This invention relates to control systems for regulating the operation of fractionation columns.

It is common practice in the petroleum and chemical industries to separate fluid mixtures by distillation processes. Various types of fractionation columns have been devised for this purpose. Many of these columns are provided with a plurality of trays which are spaced vertically from one another. The fluid mixture to be separated is introduced into the column and heat is applied to the lower region of the column to vaporize liquids. A first product stream comprising the lower boiling constituent or constituents of the fluid mixture is removed from the top of the column and a second product stream comprising the higher boiling constituent or constituents is removed from the bottom of the column. A portion of the overhead vapor is condensed and returned to the column as external reflux.

Whenever possible, fractionation columns are operated so that the feed mixture to be separated is introduced into the column at a fairly constant rate and at a constant temperature. This feed is often passed in heat exchange relationship with the kettle product to elevate the temperature of the feed to a desired value. However, a sudden change in the rate of flow of the kettle product can result in a change in temperature of the feed mixture supplied to the column. If the temperature of the feed should increase suddenly, for example, the amount of vapor condensed at the feed tray decreases so that the kettle product flow also decreases. This in turn lowers the temperature of the feed mixture which is passed in heat exchange relationship with the kettle product. Thus, an oscillation can be sustained within the closed loop if an auxiliary control of the feed temperature is not capable of making a rapid correction.

Another difficulty which is encountered in the operation of fractionation columns results from changes in the amount of cooling supplied to the overhead vapors. An increasing use has been made in recent years of fan coolers for condensing these overhead vapors. With such a cooler, it is difficult to regulate the exact amount of cooling supplied to the vapors. Sudden atmospheric temperature changes, such as occur during a rainstorm, for example, result in a lowering of the reflux temperature. This causes an increase in the flow of liquid leaving the top tray because more of the vapor which enters this tray is condensed. The net result is an increase in overhead product purity at the expense of a decreased overhead product rate.

In accordance with the present invention, there is provided a control system which is adapted to compensate for changes in temperature of the feed and external reflux directed to a fractionation column. Internal reflux is defined herein as the external reflux returned to the column plus the vapor which is condensed near the top of the column by subcooled external reflux. Internal feed is defined herein as the feed applied to the column plus the vapor which is condensed near the feed tray by subcooled feed. The internal reflux is computed from a measurement of the rate of flow of the external reflux and a measurement of the temperature difference between the external reflux and a region near the top of the column. The internal feed is computed from a measurement of the flow of feed to the column and the temperature difference between the feed and a region within the column near the feed tray. In response to these computations, the ratio of internal reflux to internal feed is maintained at a preselected value. This system results in a much smoother operation of the column than has been obtainable heretofore.

Accordingly, it is an object of this invention to provide an improved control system for a fractionation column. Another object is to provide apparatus for computing the internal feed in a fractionation column.

A further object is to provide a system for maintaining the ratio of the internal reflux to the internal feed in a fractionation column constant at a preselected value.

Other objects, advantages and features of this invention should become apparent from the following detailed description, in conjunction with the accompanying drawing which is a schematic representation of the computer and control system of this invention.

Referring now to the drawing in detail, there is shown a conventional fractionation column 10 which is provided with a number of vapor-liquid contacting trays. A fluid mixture to be separated is introduced into a surge tank 11 through a conduit 12. The feed mixture flows from surge tank 11 through a conduit 19 to an intermediate region of column 10. Heat is supplied to the lower region of column 10 by the passage of steam or other heating medium through a conduit 13 which is in heat exchange relationship with column 10. Vapors are removed from the top of column 10 through a conduit 14 which communicates with an accumulator 15 through a condenser 16. A portion of the resulting condensate in accumulator 15 is returned to the top of column 10 as external reflux through a conduit 17. The remainder of the condensate is removed through a conduit 18 as the overhead product stream. The flow through conduit 18 is regulated by a liquid level controller 24 which adjusts a valve 25 to tend to maintain the predetermined liquid level in accumulator 15. A liquid kettle product stream is removed from the bottom of column 10 through a conduit 21. The flow through conduit 21 is regulated by a liquid level controller 22 which adjusts a valve 23 to tend to maintain a predetermined liquid level in the bottom of column 10.

In order to explain the operation of the control system of this invention, an equation which is representative of the internal reflux in a fractionation column will be derived.

The material balance at the top tray of the fractionator can be expressed:

$$R_e + V_1 = R_1 + V_o \qquad (1)$$

where
$R_e$ = mass flow of liquid entering top tray (external reflux)
$V_1$ = mass flow of vapor entering top tray
$R_1$ = mass flow of liquid leaving top tray (internal reflux)
$V_o$ = mass flow of vapor leaving top tray.

The heat balance at the top tray can be expressed:

$$R_e h_e + V_1 H = R_1 h_1 + V_o H \qquad (2)$$

where
$h_e$ = enthalpy of external reflux
$h_1$ = enthalpy of internal reflux
$H$ = enthalpy of vapor streams (assumed to be equal).

The enthalpy of the vapor streams entering and leaving the top tray can be expressed:

$$H = h_1 + \lambda \qquad (3)$$

where $\lambda$ is the heat of vaporization of liquid on the tray.
The enthalpy of the external reflux can be expressed:

$$h_e = h_1 - C_p \Delta T \qquad (4)$$

where $C_p$ = specific heat of the external reflux stream
$\Delta^T$ = the difference in temperature between the top tray and external reflux.

Equation 3 can be substituted into Equation 2 to eliminate H and rewritten:

$$V_1(h_1+\lambda) - V_0(h_0+\lambda) = R_i h_1 - R_e h_e \quad (5)$$

Equation 4 can be substituted into Equation 5 to eliminate $h_e$ and rewritten:

$$(h_1+\lambda)(V_1-V_0) = h_1(R_i-R_e) + R_e C_p \Delta^T \quad (6)$$

From Equation 1 it is known:

$$V_1 - V_0 = R_i - R_e \quad (7)$$

Equation 7 can be substituted into Equation 6 and reduced to obtain:

$$R_i = R_e\left(1 + \frac{C_p}{\lambda}\Delta^T\right) \quad (8)$$

Apparatus is provided which establishes a signal representative of the internal reflux $R_i$. A differential pressure transmitter 27 is connected across an orifice in conduit 17 to establish a signal which is representative of the differential pressure across the orifice. This signal is applied to the input of a means 28 for establishing an output signal representative of the square root of the input signal. The output signal of means 28, which is thus representative of the flow $R_e$ through conduit 17, is applied to the first input of a multiplier 29. A first thermocouple 30 is disposed in conduit 17 adjacent column 10, and a second thermocouple 31 is disposed in conduit 14 adjacent column 10. These two thermocouples are connected in opposition to the input of a transducer 32 which establishes a signal representative of the difference between the two temperatures sensed by the two thermocouples. If it is assumed that the temperature of the vapor above the top tray is equal to the temperature of the liquid on the top tray, the term $\Delta^T$ is thus established by transducer 32. Transducer 32 is calibrated to provide an output signal proportional to the term.

$$\left(1 + \frac{C_p}{\lambda}\Delta^T\right)$$

of Equation 8. This signal is applied to the second input of multiplier 29. The output signal from multiplier 29 is thus equal to the term $R_i$ of Equation 8.

An equation representative of the internal feed in a fractionation column will now be derived.

The material balance at the feed tray of the fractionator can be expressed:

$$R_i + F + V_1 = L + V_2 \quad (9)$$

where
$R_i$ = internal reflux entering feed tray
$F$ = feed entering feed tray
$V_1$ = mass flow of vapor entering feed tray
$L$ = total liquid leaving feed tray
$V_2$ = mass flow of vapor leaving feed tray.

The heat balance at the feed tray can be expressed:

$$h_{R_i} + h_F F + H_{V_1} V_1 = h_L L + H_{V_2} V_2 \quad (10)$$

where
$h_{R_i}$ = enthalpy liquid $R_i$
$h_F$ = enthalpy of feed
$H_{V_1}$ = enthalpy of vapor $V_1$
$h_L$ = enthalpy of liquid L
$H_{V_2}$ = enthalpy of vapor $V_2$.

If it is assumed that the liquid L leaving the feed tray and the vapor $V_2$ leaving the feed tray are at the same temperature, $$H_{V_2} = h_L + \lambda' \quad (11)$$

where $\lambda'$ is the heat of vaporization of liquid on the feed tray.

Also $$h_F = h_L - C_p'(T_T - T_F) \quad (12)$$

where
$C_p'$ = specific heat of the feed
$T_T$ = temperature of liquid on the feed tray
$T_F$ = temperature of the feed.

It is also assumed that $h_{R_i} = h_L$ and $H_{V_1} = H_{V_2}$. These relationships and Equations 11 and 12 can be substituted into Equation 10 and rewritten:

$$h_L R_i + F h_L - F C_p'(T_T - T_F) \\ + (h_L + \lambda')(V_1 - V_2) = h_L L \quad (13)$$

From Equation 9 it is known:

$$(V_1 - V_2) = L - R_i - F \quad (14)$$

Equation 14 can be substituted into Equation 13 and reduced to obtain:

$$L = F\left[1 + \frac{C_p'}{\lambda'}(T_T - T_F)\right] + R_i \quad (15)$$

If the internal feed $F_i$ is defined as $(L - R_i)$ and $\Delta^{T'}$ is defined as $(T_T - T_F)$, Equation 15 becomes:

$$F_i = F\left(1 + \frac{C_p'}{\lambda'}\Delta^{T'}\right) \quad (16)$$

A second differential pressure transducer 35 is connected across an orifice in conduit 19 to establish an output signal representative of the square of the flow through conduit 12. This signal is applied through a second square root means 33 to the first input of a second multiplier 34. Thermocouples 36 and 37 are disposed in conduit 19 and column 10 adjacent the feed tray, respectively. These two thermocouples are connected in opposition to the input of a transducer 38. Transducer 38 is calibrated to provide an output signal representative of the term $$\left(1 + \frac{C_p'}{\lambda'}\Delta^{T'}\right)$$

of Equation 16. The output signal of transducer 38 is applied to the second input of multiplier 34. The output signal of multiplier 34 is thus representative of the term $F_i$ of Equation 16.

The output signal of multiplier 29 is applied to the first input of a ratio controller 40. The output signal of multiplier 34 is applied through a lag means 41 to the second input of ratio controller 40. The set point of controller 40, which can be regulated manually, establishes the desired ratio between the internal reflux and the internal feed for a given separation. The output signal of multiplier 29 is also applied to the input of a flow recorder-controller 44 which adjusts a valve 45 in reflux conduit 17. The output signal of multiplier 34 is also applied to a flow recorder-controller 42 which adjusts a valve 43 in feed conduit 12. Thus, the external reflux is regulated to tend to maintain the computed internal reflux constant, and the feed rate is regulated to tend to maintain the internal feed constant. The output signal of ratio controller 40 adjusts the set point of controller 44 to maintain a preselected ratio between the internal reflux and the internal feed. This is the primary control system of this invention. Means 41 lags the transmission of the signal from multiplier 34 by a time representative of the travel time of the feed mixture through column 10 and accumulator 15 to reflux conduit 17.

A sample is withdrawn from overhead vapor conduit 14 and directed to an analyzer 45 through a conduit 46. Analyzer 45 provides an output signal which is representative of the composition of the overhead vapor. This signal adjusts the set point of a flow recorder-controller 47 which adjusts a valve 48 in steam conduit 13. The amount of steam supplied to the column is thus regulated in response to changes in composition of the overhead vapor. If the heavier constituent of the feed mixture should increase in the overhead vapor, less steam is supplied to column 10 and, conversely, more steam is supplied if the heavier constituent composition in the overhead vapor should become less than a preselected value.

A liquid level controller 50 can be provided to adjust the set point of controller 42 in response to the liquid level in surge tank 11. In this manner, the flow of feed is regulated to tend to maintain a constant head of liquid in the surge tank.

The components of the control system of this invention can be conventional apparatus well known in the art. The various transmitters, square root means, multipliers and controllers are available commercially from several instrument manufacturers. This equipment can be either pneumatically or electrically operated. As a specific example, the square root means and multipliers can be of the type described in U.S. Patent 2,643,055. Lag means 41 can be a resistance-capacitance delay means if electrical components are employed, or a restriction followed by a surge tank if pneumatic components are employed. Analyzer 45 can be any suitable composition analyzer such as a refractometer, chromatograph or infrared analyzer, for example. The choice of the analyzer will depend on the particular composition of the feed mixture being separated.

In view of the foregoing description it should be evident that there is provided in accordance with this invention a novel computer for measuring the internal feed in a fractionation column. There is also provided a control system to maintain the ratio of internal reflux to internal feed at a preselected value. This control system is effective to stabilize the operation of fractionation columns against upsets due to changes in temperature or flow of feed and external reflux.

While the invention has been described in conjunction with a present preferred embodiment, it should be evident that it is not limited thereto.

What is claimed is:

1. In a fractionation system wherein a feed mixture of two or more components is directed to a fractionation column, a temperature differential is maintained between the bottom and top of said column, a vapor stream is removed from the top of said column, said vapor stream is cooled to condense at least a part of same, a part of the resulting condensate is returned to said column as external reflux, and a liquid stream is removed from the bottom of said column; a control system comprising first means to establish a signal $R_e$ representative of the flow of said external reflux, second means to establish a signal $\Delta^T$ representative of the difference between the temperature of vapor removed from said column and the temperature of said external reflux, third means responsive to said first and second means to establish a signal $R_i$ which is equal to $$R_e\left(1+\frac{C_p}{\lambda}\Delta^T\right)$$

where $C_p$ is the specific heat of said external reflux and $\lambda$ is the heat of vaporization of liquid in the top of said column, fourth means to establish a signal F representative of the flow of said feed mixture, fifth means to establish a signal $\Delta^{T'}$ representative of the difference between the temperature of vapor in said column at the region said feed mixture enters said column and the temperature of said feed mixture, sixth means responsive to said fourth and fifth means to establish a signal $F_i$ which is equal to $$F\left(1+\frac{C_p'}{\lambda'}\Delta^{T'}\right)$$

where $C_p'$ is the specific heat of said feed mixture and $\lambda'$ is the heat of vaporization of liquid in said column at said region where said feed mixture enters, seventh means responsive to said third and sixth means to establish a signal representative of the ratio of $R_i$ to $F_i$, and eighth means responsive to said seventh means to regulate the relative flows of said external reflux and said feed mixture.

2. The control system of claim 1 wherein said eighth means adjusts the flow of said external reflux, and further comprising ninth means responsive to said sixth means to adjust the flow of said feed mixture.

3. The control system of claim 1 wherein said seventh means includes means to delay said signal $F_i$ prior to the establishment of said signal representative of the ratio of $R_i$ to $F_i$.

4. The control system of claim 1 further comprising means to analyze a fluid sample from a selected region of said column, and means responsive to said means to analyze to regulate said temperature differential.

5. In a fractionation system wherein a feed mixture of two or more components is directed to a fractionation column through a conduit means having a control means therein to permit the flow of such feed mixture to be regulated, a temperature differential is maintained between the bottom and top of said column, a vapor stream is removed from the upper region of said column, and a liquid stream is removed from the lower region of said column; apparatus to compute the internal feed in said column comprising first means to establish a signal F representative of the flow of said feed mixture to said column, second means to establish a signal $\Delta^{T'}$ representative of the difference between the temperature of vapor in said column at the region said feed mixture enters said column and the temperature of said feed mixture, and third means responsive to said first and second means to establish a signal $F_i$; which is equal to $$F\left(1+\frac{C_p'}{\lambda'}\Delta^{T'}\right)$$

where $C_p'$ is the specific heat of said feed mixture and $\lambda'$ is the heat of vaporization of liquid in said column at said region where said feed mixture enters, said signal $F_i$ representing the internal feed in said column.

6. The apparatus of claim 5 further comprising means responsive to said third means to actuate said control means so as to regulate the flow of the feed mixture to said column by increasing said flow when said signal $F_i$ decreases and by decreasing said flow when said signal $F_i$ increases so as to maintain said flow at a preselected rate.

7. A fractionation system comprising a fractionation column, a surge tank, first conduit means communicating with said surge tank to supply a feed mixture to be separated, second conduit means communicating between said surge tank and said column to transfer the feed mixture to the column, means to supply heat to the lower region of said column, an accumulator, a condenser, third conduit means communicating between the top of said column and said accumulator through said condenser, fourth conduit means communicating between said accumulator and an upper region of said column to return liquid to said column as external reflux, fifth conduit means communicating with said accumulator to remove a first product stream, sixth conduit means communicating with the lower region of said column to remove a second product stream, first means to establish a signal F representative of the rate of flow through said second conduit means, second means to establish a signal $\Delta^{T'}$ representative of the difference between the temperature of vapor in said column at the region said second conduit means communicates with said column and the temperature of the feed mixture in said second conduit means, third means responsive to said first and second means to establish a signal $F_i$ which is equal to $$F\left(1+\frac{C_p'}{\lambda'}\Delta^{T'}\right)$$

where $C_p'$ is the specific heat of the feed mixture and $\lambda'$ is the heat of vaporization of liquid in said column at said region said second conduit means communicates with said column, fourth means responsive to said third means to regulate the flow through said second conduit means, and fifth means responsive to the liquid level in said surge tank to adjust said fourth means to tend to maintain a preselected liquid level in said surge tank.

8. The system of claim 7 further comprising means to analyze a fluid sample from a selected region of said column, and means responsive to said means to analyze to adjust said means to supply heat to said column.

9. The system of claim 7 further comprising sixth means to establish a signal $R_e$ representative of the flow of fluid through said fourth conduit means, seventh conduit means to establish a signal $\Delta^T$ representative of the difference between the temperature of vapor removed from said column and the temperature of fluid returned to said column through said fourth conduit means, eighth means responsive to said sixth and seventh means to establish a signal $R_i$ which is equal to $$R_e\left(1+\frac{C_p}{\lambda}\Delta^T\right)$$

where $C_p$ is the specific heat of said external reflux and $\lambda$ is the heat of vaporization of liquid in the top of said column, ninth means responsive to said third and eighth means to establish a signal representative of the ratio of $R_i$ to $F_i$, and tenth means responsive to said ninth means to regulate the relative flows of said external reflux and said feed mixture.

References Cited in the file of this patent

UNITED STATES PATENTS

| | | |
|---|---|---|
| 2,684,326 | Boyd | July 20, 1954 |
| 2,767,133 | Shobe | Oct. 16, 1956 |

OTHER REFERENCES

Randall et al.: "Separating Process," from Industrial and Engineering Chemistry, January 1940, pages 125–129. Minor cycle